United States Patent
Annapureddy et al.

(10) Patent No.: US 9,046,370 B2
(45) Date of Patent: Jun. 2, 2015

(54) METHODS FOR PROVIDING A NAVIGATION ROUTE BASED ON NETWORK AVAILABILITY AND DEVICE ATTRIBUTES

(71) Applicant: QUALCOMM Incorporated, San Diego, CA (US)

(72) Inventors: Koushik Annapureddy, Tampere (FI); Keir Finlow-Bates, Kangasala (FI)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 13/787,651

(22) Filed: Mar. 6, 2013

(65) Prior Publication Data
US 2014/0257695 A1    Sep. 11, 2014

(51) Int. Cl.
*G01C 21/00* (2006.01)
*G08G 1/0968* (2006.01)

(52) U.S. Cl.
CPC .......... *G01C 21/00* (2013.01); *G08G 1/096811* (2013.01)

(58) Field of Classification Search
CPC ... G08G 1/096811; G08G 1/20; G01C 21/00; G01C 21/3461; G01C 21/3476; H04W 4/02; H04W 4/028; H04W 52/0261; G05D 1/0295; H04L 45/123; H04L 45/124; H04L 29/06; H04L 12/1818; H04L 69/24; G01S 5/0252
USPC .......... 701/420, 527, 537, 117; 455/522, 230, 455/456.3; 370/260, 238
See application file for complete search history.

(56) References Cited

U.S. PATENT DOCUMENTS

| | | | |
|---|---|---|---|
| 7,609,678 B2 | 10/2009 | Sharma et al. | |
| 7,925,436 B2 | 4/2011 | Blackwood | |
| 8,260,546 B2 | 9/2012 | Soelberg | |
| 8,311,741 B1 * | 11/2012 | Lawther et al. | 701/527 |
| 8,335,637 B2 | 12/2012 | Deurwaarder et al. | |
| 2006/0146717 A1 * | 7/2006 | Conner et al. | 370/238 |
| 2006/0161341 A1 * | 7/2006 | Haegebarth et al. | 701/209 |
| 2012/0009890 A1 * | 1/2012 | Curcio et al. | 455/230 |
| 2012/0028670 A1 * | 2/2012 | Lim | 455/522 |
| 2012/0303266 A1 * | 11/2012 | Su et al. | 701/420 |
| 2013/0122935 A1 * | 5/2013 | Das et al. | 455/456.3 |
| 2014/0241215 A1 * | 8/2014 | Massover et al. | 370/260 |

OTHER PUBLICATIONS

International Search Report and Written Opinion—PCT/US2014/018661—ISA/EPO—May 16, 2014.

* cited by examiner

*Primary Examiner* — Tuan C. To
*Assistant Examiner* — Yuri Kan
(74) *Attorney, Agent, or Firm* — Kilpatrick Townsend & Stockton LLP

(57) ABSTRACT

Systems, methods, apparatuses, and computer-readable media for are provided for providing a navigation route based on network availability. In one embodiment, a method includes receiving a request for a navigation route. The method may further include providing the navigation route, the navigation route taking into account accessibility information relating to accessibility of at least one wireless network at different geographic locations along the navigation route and device specific information relating to attributes of a mobile device. The accessibility information may include data collected by different mobile devices at different geographic locations. The accessibility information may also be stored at a centralized server.

29 Claims, 15 Drawing Sheets

208

| Network Type | Network Name | Lattitude | Longtiude | Average Signal Strength | Congestion Level | Time | Average Speed |
|---|---|---|---|---|---|---|---|
| LTE | AT&T | 66 | 6 | -92dB | Medium | 8:00 AM | 4 Mbps |
| 4G | AT&T | 9 | 76 | -95dB | Medium | 9:32 AM | 2Mbps |
| Wi-Fi | Starbucks | 65 | 61 | -89dB | Low | 10:14 PM | 8Mbps |
| 3G | AT&T | 82 | 52 | -88dB | Low | 12:15 PM | 0.5Mbps |
| LTE | AT&T | 41 | 9 | -105dB | High | 2:30 AM | 4.5Mbps |
| 3.5G | AT&T Roaming | 12 | 52 | -82dB | Low | 4:45 PM | 1Mbps |
| 2G | AT&T Legacy | 92 | 77 | -110dB | Medium | 5:21 PM | 0.2Mbps |
| Wi-Fi | SV Public Wi-Fi | 20 | 69 | -85dB | High | 4:56 PM | 9Mbps |
| 4G | AT&T | 40 | 97 | -107dB | High | 2:20 PM | 2.2Mbps |

| Mobile Device Type | Mobile Device Operating System | Battery Used by cell radio |
|---|---|---|
| Apple iPhone 5 | iOS 6.1 | 9% |
| Samsung Galaxy S3 | Android 4.2 | 15% |
| Samsung Galaxy S2 | Android 4.1 | 22% |
| Samsung Galaxy Note | Android 3.2 | 18% |
| Apple iPhone 4S | iOS 5 | 14% |
| Apple iPhone 3G | iOS 4.1 | 26% |
| HTC Evo | Android 4.1 | 17% |
| Motorola Droid | Android 3.1 | 22% |
| Apple iPhone 5 | iOS 6.1 | 25% |

| Network Number | North Handoff Network | South Handoff Network | East Handoff Network | West Handoff Network |
|---|---|---|---|---|
| 1 | N/A | 3 | 6 | N/A |
| 2 | 3 | 9 | N/A | N/A |
| 3 | 1 | 2 | 8 | N/A |
| 4 | 8 | N/A | 5 | 9 |
| 5 | 8 | 4 | N/A | 4/8 |
| 6 | N/A | 7/8 | N/A | 1 |
| 7 | 6 | N/A | N/A | 6/8 |
| 8 | 6 | 4 | 5/7 | 3 |
| 9 | 2 | N/A | 4 | N/A |

FIG. 5

METHODS FOR PROVIDING A NAVIGATION ROUTE BASED ON NETWORK AVAILABILITY AND DEVICE ATTRIBUTES

BACKGROUND

Aspects of the disclosure relate to computing technologies. In particular, aspects of the disclosure relate to mobile computing device technologies, such as systems, methods, apparatuses, and computer-readable media that provide a navigation route based on network availability.

During execution of point-to-point mobile navigation applications, personal navigation devices (PNDs) and mobile devices opt to provide routes having certain direction paths based on factors such as traffic, shortest path, etc. However, some scenarios exist where a user may access another network intensive application on the PND or mobile device. In such scenarios, the network intensive applications often experience variances in network speed due to the potential different network types a PND or mobile device may encounter while travelling along the navigation route. These variances in network speeds may cause a user of the PND or mobile device to experience breaks in connectivity and low quality of service (QoS) while using the network intensive applications.

BRIEF SUMMARY

These problems and others may be solved according to embodiments of the present invention, described herein. Embodiments of the invention solve problems associated with low quality mobile application experience during mobile navigation.

Systems, methods, apparatuses, and computer-readable media for are provided for providing a navigation route based on network availability. The present invention provides methods for maintaining a high QoS for network intensive applications on a mobile device during route navigation. An application or daemon residing on the mobile device may log network information related to signal strength of a network, network type to which the device is connected, and network-to-network handover information. The network information may also be associated with location data obtained via GPS, providing location information for the network information. The network information may further include known Wi-Fi zones within a geographic location. The network information may also be collected by a plurality of mobile devices (crowd-sourced), and may be uploaded to a centralized database. The application or daemon may also log device information specific to the device receiving the navigation route and logging the network information. In some embodiments, estimated battery consumption for the mobile device may be computed based on the network information.

In some embodiments, a method includes receiving a request for a navigation route. The method may further include providing the navigation route, the navigation route taking into account accessibility information relating to accessibility of at least one wireless network at different geographic locations along the navigation route and device specific information relating to attributes of a mobile device. The accessibility information may include data collected by different mobile devices at different geographic locations. The accessibility information may also be stored at a centralized server.

In some embodiments, the navigation route takes into account a quality of service (QoS) priority level.

In some embodiments, the accessibility information includes signal strength information of the wireless network, network congestion information of the wireless network, communication standard information of the wireless network, and geographic location information of the wireless network.

In some embodiments, the network congestion information includes network congestion information in relation to time.

In some embodiments, the device specific information includes manufacturer information of the mobile device, operating system information of the mobile device, and mobile subscriber plan information of the mobile device.

In some embodiments, the accessibility information and the device specific information reside within a centralized database accessible by the mobile device.

In some embodiments, the method may further include prefetching data for use by an application residing on the mobile device based on the accessibility information, wherein the accessibility information comprises wireless network handover information.

In some embodiments, the accessibility information is periodically received by the mobile devices.

In some embodiments, the accessibility information is forwarded, via the mobile device, to a personal navigation device for providing the navigation route.

In some embodiments, the different mobile devices are on the same wireless network.

In some embodiments, the method may further include computing estimated battery consumption for the mobile device based on the accessibility information.

In some embodiments, the method may further include disabling a radio of the mobile device based on the accessibility information.

In some embodiments, an apparatus includes a navigation module configured to provide a navigation route and a processor coupled to the navigation module. The processor may be configured to receive a request for the navigation route. The processor may further be configured to provide the navigation route, the navigation route taking into account accessibility information relating to accessibility of at least one wireless network at different geographic locations along the navigation route and device specific information relating to attributes of a mobile device. The accessibility information may include data collected by different mobile devices at different geographic locations. The accessibility information may be stored at a centralized server.

In some embodiments, an apparatus includes means for receiving a request for a navigation route. The apparatus may further include means for providing the navigation route, the navigation route taking into account accessibility information relating to accessibility of at least one wireless network at different geographic locations along the navigation route and device specific information relating to attributes of a mobile device. The accessibility information may include data collected by different mobile devices at different geographic locations. The accessibility information may be stored at a centralized server.

In some embodiments, a computer program product residing on a processor-readable medium and including processor-readable instructions is configured to cause a processor to receive a request for a navigation route and provide the navigation route, the navigation route taking into account accessibility information relating to accessibility of at least one wireless network at different geographic locations along the navigation route and device specific information relating to attributes of a mobile device. The accessibility information may include data collected by different mobile devices at different geographic locations. The accessibility information may be stored at a centralized server.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 illustrates network accessibility data contents of a centralized database according to embodiments of the present invention.

FIG. 4 illustrates device specific information data contents of a centralized database according to embodiments of the present invention.

FIG. 5 illustrates network handover information data contents of a centralized database according to embodiments of the present invention.

DETAILED DESCRIPTION

Figure 1:
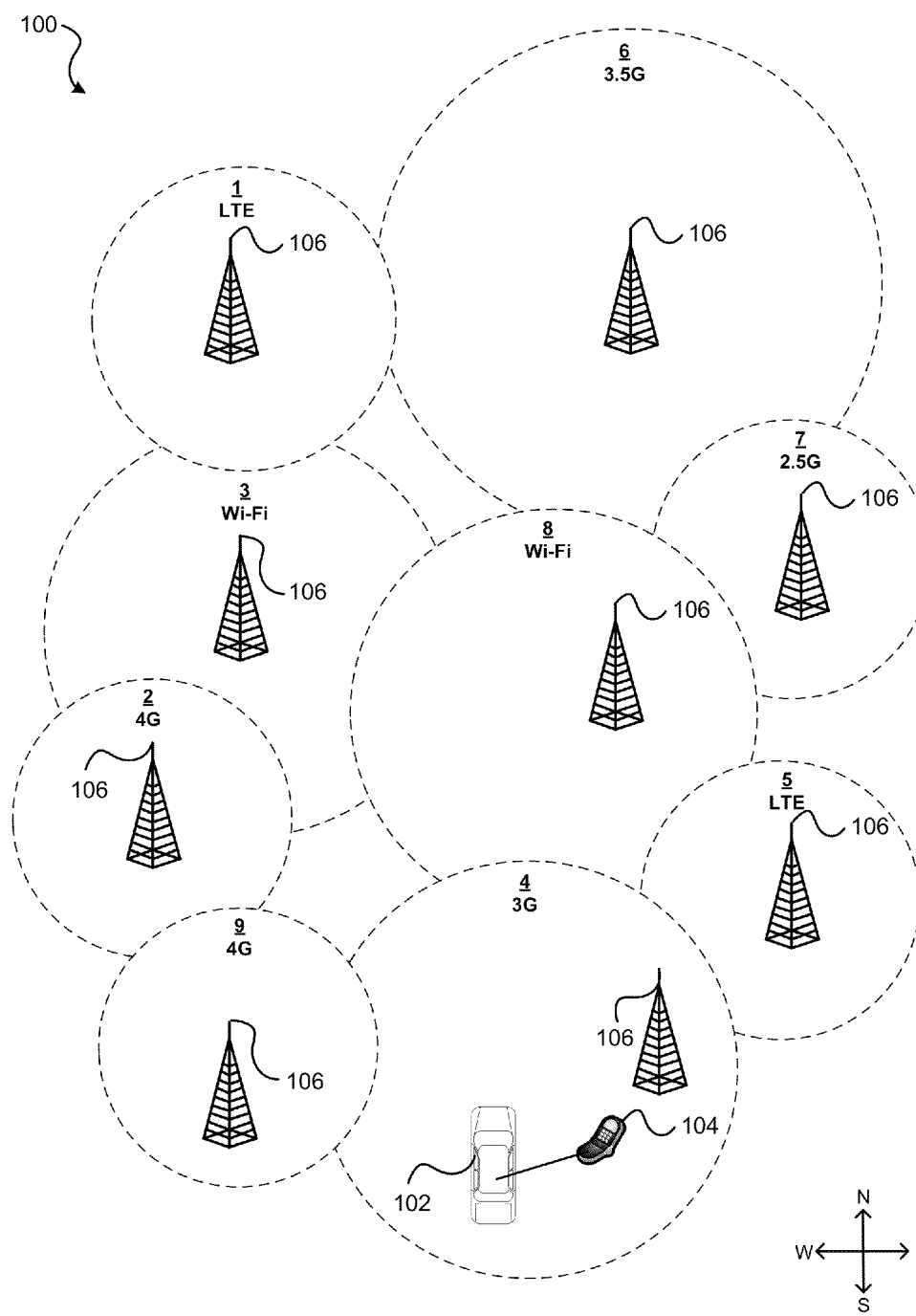
FIG. 1 illustrates a number of wireless networks in different geographic locations within a geospace according to embodiments of the present invention.

Aspects of the disclosure provide more convenient, intuitive, and functional ways of providing navigation. An application or daemon residing on the mobile device may log network information related to signal strength of a network, network type to which the device is connected, and network handover information. The network information may also be associated with location data obtained via GPS, providing location information for the network information. The network information may further include known Wi-Fi zones within a geographic location. The network information, collected by a plurality of mobile devices (crowd-sourced), may be uploaded to a centralized database. The application or daemon may also log device specific information specific to the device receiving the navigation route and logging the network information. The application or daemon may also log device specific information specific to the device receiving the navigation route and logging the network information.

When a user requests a navigation route, from a start point to an end point, the mobile device may access the crowd-sourced network information and device specific information stored in the centralized database. If a user indicates that they want a high QoS for their applications residing on the mobile device while travelling, the navigation route provided may take into account the network information relating to network accessibility and the device specific information. For example, if a user indicates they want high QoS while travelling, the navigation route provided may instruct the user to travel through geographical zones having the most LTE connections to provide a high-speed high-reliability connection. The reliability of the connection may also be determined based on the device specific information, e.g. certain brands of mobile devices may experience better network performance in certain areas than others. Alternatively, the navigation route provided may instruct the user to travel through those geographical zones having no loss of network availability (dead-zones).

In an embodiment, data used by an application on the mobile device may be prefetched based on the network availability information. For example, if a user indicates that they want a high QoS and they will be using a high network intensive application, e.g. YouTube, the mobile device may prefetch the application data while in a high network speed geographical zone and prior to entering a known low network speed geographical zone.

In an embodiment, the network availability information from the centralized database may be used to calculate an estimated battery consumption of the mobile device while travelling through the geospace.

In an embodiment, the mobile device may access the centralized database and forward the network accessibility information to a personal navigation device. The personal navigation device may then perform the route navigation taking into account the network accessibility information, device specific information, and the user's QoS preference.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Crowd-Sourcing of Network Accessibility Information

FIG. 1 illustrates a number of wireless networks 106 in different geographic locations within a geospace 100 according to embodiments of the present invention. Each wireless network 106 may be located in a different geographic location within the geospace 100. Further, each wireless network 106 may employ a different communication standard, e.g. LTE, 4G, 3.5G, 3G, 2.5G, and Wi-Fi. Each wireless network 106 may be capable of providing wireless network connectivity within a certain range or zone of the geospace 100. In this particular example, there are nine different zones (zones 1-9) within the geospace 100. Each zone (zones 1-9) provides wireless network capability having a certain broadcast range within the geospace 100. The broadcast range provided by some wireless network zones may overlap with the broadcast range of other wireless network zones, e.g. zone 4 with zones 5, 8, and 9.

The geospace 100 further includes a mobile device 104. In some embodiments, the mobile device 104 may be a cellular phone. The mobile device 104 may be operated by a user and connect to any of the wireless networks 106 via one of the wireless network communication standards. A user may experience a different QoS on each of the wireless networks 106 and thus experience a different wireless network speed based upon various factors including, but not limited to, the wireless network communication standard, congestion within the wireless zone, and signal strength of the wireless network 106. The differences in QoS and network speed may also be based upon particulars of the mobile device 104, for example, the mobile device's 104 manufacturer and operating system.

A user may use the mobile device 104 while travelling through the geospace 100. In one embodiment, the user may travel with the mobile device 104 through the geospace 100 in a vehicle 102. While travelling through the geospace 100, the user and the mobile device 104 may travel through different wireless network zones. The user may also encounter a "dead-zone," where none of the broadcast ranges of the wireless network zones are present and thus there may be no wireless network 106 connectivity. Each wireless network 106 may be capable of a "handoff," where the wireless network 106 transfers the network connection of the mobile device 104 as it is leaving one wireless network zone and entering another wireless network zone. For example, a handoff may occur when a mobile device 104 is leaving the 3G wireless connection in zone 4 and entering the Wi-Fi wireless connection in zone 8.

In some embodiments of the present invention, the mobile device 104 may be capable of logging wireless network 106 accessibility information as the user and mobile device 104 travel through the wireless networks 106 within the geospace 100. It can be appreciated that there may be any number of mobile devices 104 within the geospace 100. The wireless network accessibility information for each wireless network 106 may include signal strength information of the wireless network 106, network congestion information of the wireless network 106, communication standard information of the wireless network 106, and geographic location information of the wireless network. The wireless network accessibility information for each wireless network 106 may also include manufacturer information of the mobile device 104, operating system information of the mobile device 104, and mobile subscriber plan information of the mobile device 104.

In some embodiments of the present invention, the mobile device 104 may also log device specific information. The device specific information for each mobile device 104 may include the device manufacturer, device operating system, etc.

The logged wireless network accessibility information and device specific information may be stored on the mobile device 104. In some embodiments, the wireless network accessibility information and device specific information may be uploaded to a centralized database (See FIG. 2) for storage. The centralized database may include wireless network accessibility information and device specific information logged from different mobile devices 104 within the geospace 100. As such, the wireless network accessibility information and device specific information may be crowd-sourced for the wireless networks 106 within the geospace 100 and may be stored within the centralized database.

Figure 2:
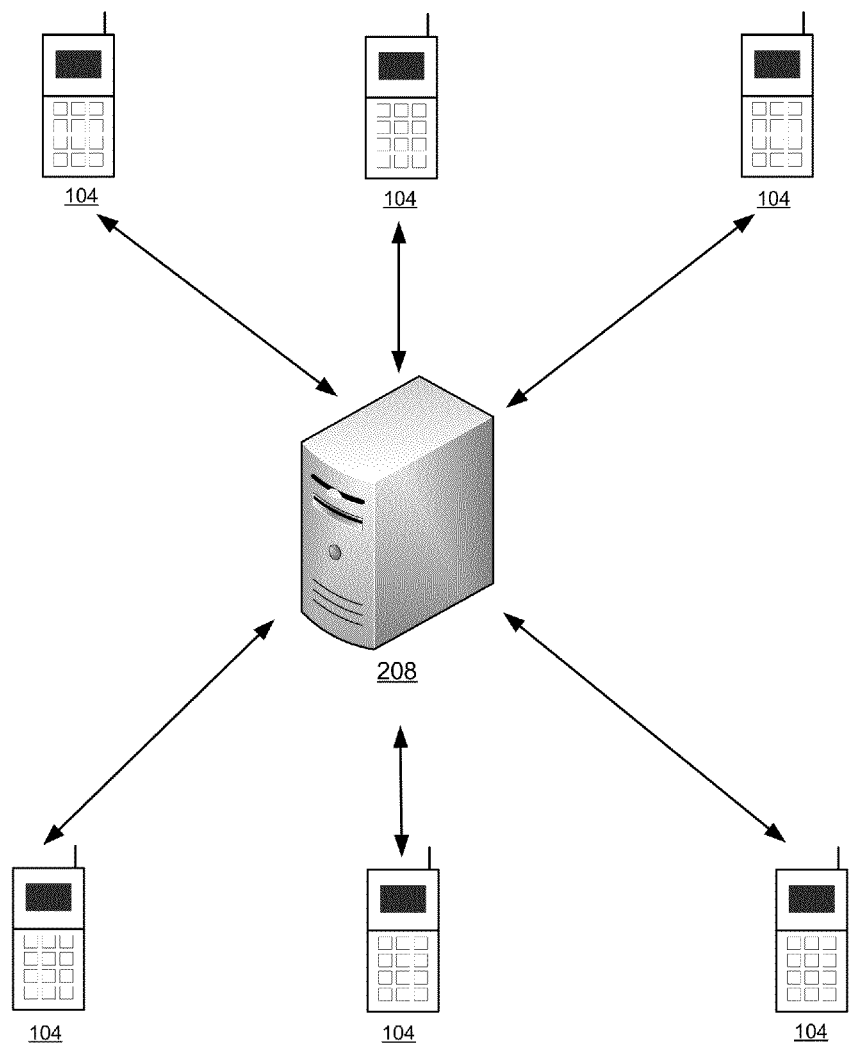
FIG. 2 illustrates a centralized database in communication with different mobile devices according to embodiments of the present invention.

FIG. 2 illustrates a centralized database 208 in communication with different mobile devices 104 according to embodiments of the present invention. As mentioned above, the centralized database 208 may store crowd-sourced wireless network accessibility information for the wireless networks 106 within the geospace 100 and device specific information. The centralized database 208 may communicate with the mobile devices 104 using any wireless network communication standard, including but not limited to, LTE, 4G, 3.5G, 3G, 2.5G, and Wi-Fi.

As mentioned above, the wireless network accessibility information stored within the centralized database 208 may include signal strength information of the wireless network 106, network congestion information of the wireless network 106, communication standard information of the wireless network 106, and geographic location information of the wireless network. The wireless network accessibility information for each wireless network 106 may also include manufacturer information of the mobile device 104, operating system information of the mobile device 104, and mobile subscriber plan information of the mobile device 104.

In some embodiments, the mobile device 104 may periodically receive the crowd-sourced wireless network accessibility information from the centralized database 208. As such, the mobile device 104 may receive wireless network accessibility information for wireless networks 106 (FIG. 1) that it has not previously traveled through, but another mobile device 104 has. The mobile device 104 may take into account the wireless network accessibility information to provide a navigation route to the user.

FIG. 3 illustrates wireless network accessibility data contents of a centralized database 208 according to embodiments of the present invention. In this illustration, the example data contents of the centralized database 208 correspond to the wireless networks 106 of FIG. 1. Data stored within the centralized database 208 may be crowd-sourced by different mobile devices 104 (FIG. 1), as described above. The centralized database 208 may store the following information corresponding to wireless network accessibility of the wireless networks 106: network number, network type, network name, latitude, longitude, average signal strength, congestion level, time, and average speed. The network number data corresponds to the network zones of the networks 106 in FIG. 1. The network type data is information about the wireless network type, e.g., LTE, 4G, 3.5G, 3G, 2.5G, and Wi-Fi. The network name data is the carrier specific network name or Wi-Fi network service set identification (SSID). The latitude and longitude data corresponds to the coordinates at which wireless network accessibility information for each wireless network 106 (FIG. 1) was logged by the mobile device 104 (FIG. 1). The average signal strength data indicates the average signal strength for the wireless network 106 as perceived by the mobile device 104 (FIG. 1). The congestion level indicates how congested the wireless network 106 is with other devices within and connecting to the same network 106 (FIG. 1). In some embodiments, centralized database 208 may further include time of day data to which the congestion level corresponds to. The time of day data provides time-specific information correlating to the congestion level, as some periods throughout the day may experience more network congestion than others. In some embodiments, centralized database 208 may further include the average speed experienced by mobile devices 104 (FIG. 1) within the particular network. The average speed may be an average taking into account a number of mobile devices involved in the crowd-sourced of the network accessibility information. As such, there may be wireless network accessibility information about the congestion level at specific time periods. A mobile device 104 (FIG. 1) may use this wireless network accessibility information when providing the navigation route to the user.

FIG. 4 illustrates device specific information data contents of a centralized database 208 according to embodiments of the present invention. Data stored within the centralized database 208 may be crowd-sourced by different mobile devices 104 (FIG. 1), as described above. The centralized database 208 may store, but is not limited to, the following device specific information corresponding to the different devices 104 (FIG. 1) that logged the wireless network accessibility information of the wireless networks 106 and stored the information in the centralized database 208: mobile device type, mobile device operating system, and battery consumption by the cellular radio of the mobile device. The mobile device type data corresponds to the manufacturer information and hardware model of the mobile device 104 (FIG. 1) that was used to log the wireless network accessibility information. The mobile device operating system data corresponds to the specific operating system version of the mobile device 104 (FIG. 1) that was used to log the wireless network accessibility information. The battery consumption by the cellular radio of the mobile device indicates the average percentage of the mobile device's battery that may be consumed by active use of the cellular radio while connected to a network.

The wireless network accessibility information stored in the centralized database 208 shown in this example is device specific and corresponds to the wireless network accessibility information depicted in FIG. 3. With the combination of the device specific wireless network accessibility information, a user may elect that the user's mobile device 104 (FIG. 1) only receive wireless network accessibility information that is logged and stored to the centralized database 208 by different mobile devices 104 (FIG. 1) of the same mobile device type and/or having the same mobile device operating system. A mobile device 104 (FIG. 1) may use this device-specific wireless network accessibility information when providing the navigation route to the user.

FIG. 5 illustrates network handover information data contents of a centralized database 208 according to embodiments of the present invention. In this illustration, the example data contents of the centralized database 208 correspond to network handoff information of the wireless networks 106 (FIG. 1) depicted in FIG. 1. Each wireless network 106 number may have a north handoff network, south handoff network, east handoff network, and west handoff network. For example, wireless network 106 (FIG. 1) zone 3, depicted in FIG. 1, has a north handoff network of zone 1, a south handoff network of zone 2, an east handoff network of zone 8, and no west handoff network. It can be appreciated that a wireless network zone may handoff to one or more zones in the same direction or not have any handoff in a particular direction, likely indicating a "dead-zone." During a handoff, the wireless network 106 (FIG. 1) transfers the network connection of the mobile device 104 as it is leaving one wireless network zone and entering another wireless network zone. For example, a handoff may occur when a mobile device 104 (FIG. 4) is leaving the 3G wireless connection in zone 4 (FIG. 1) and entering the Wi-Fi wireless connection in zone 8 (FIG. 1). A mobile device 104 (FIG. 1) may use this handoff wireless network accessibility information when providing the navigation route to the user.

Navigation Route Determined Based on Quality of Service

Figure 6:
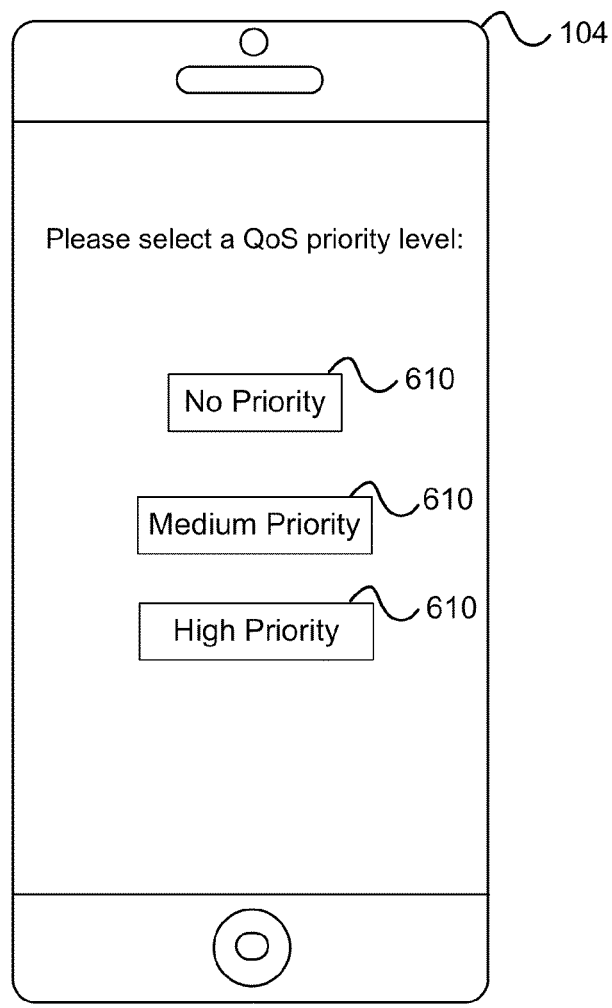
FIG. 6 illustrates options presented for a Quality of Service priority level on a mobile device according to some embodiments of the present invention.

FIG. 6 illustrates options presented for a Quality of Service priority level on a mobile device 104 according to some embodiments of the present invention. A user may request a navigation route, from a start point to an end point, from the mobile device 104. In some embodiments, a navigation engine operable to compute and provide the navigation route resides locally within the mobile device 104. In some embodiments, the navigation engine resides remotely, e.g., on a server providing communicative access to the mobile device 104.

In some embodiments, prior to computing the navigation route, the mobile device 104 may present the user with QoS priority level options 610 for which to base the navigation route on. In some embodiments, a user may select between no QoS priority, a medium QoS priority level, and a high QoS priority level. The QoS priority level options allow the user to indicate their priority for the navigation route to be based on network accessibility. For example, if a user intends on using high network intensive applications during their route (e.g., audio/video streaming applications, multiplayer gaming applications, video conferencing applications, etc.), the user may choose the high QoS priority level as these applications may perform optimally when provided with the highest QoS. Optimal performance may be considered as the application providing the intended experience to the user (e.g., with low latency, high throughput, low dropped packets, low errors, low jitter, in-order-delivery, etc.). In some embodiments, if a user chooses a high QoS priority level for the navigation route, the mobile device 104 may take into account the periodically received network accessibility information from the centralized database (FIG. 2) to provide the user with the navigation route. For example, the navigation route for a high QoS priority level may avoid dead-zones and route the user through only high-bandwidth wireless network zones (e.g., LTE and Wi-Fi networks). It can be appreciated that navigation routes based on a high QoS priority level may require more travel distance than navigation routes based on a medium QoS priority level or no QoS priority.

In another example, if a user intends on using medium network intensive applications during their route (e.g., social networking applications, photo sharing applications, calendaring applications, mail applications, etc.), the user may choose the medium QoS priority level as these applications may still perform optimally when provided with medium or average QoS and do not require a high QoS. In some embodiments, if a user chooses a medium QoS priority level for the navigation route, the mobile device 104 may take into account the periodically received network accessibility information from the centralized database (FIG. 2) to provide the user with the navigation route. For example, the navigation route for a medium QoS priority level may avoid dead-zones and route the user through medium-bandwidth and high-bandwidth wireless network zones (e.g., LTE, Wi-Fi, 4G, 3.5G, etc.). It can be appreciated that mobile device 104 may provide a navigation route through high-bandwidth wireless network zones only, in the event that the route is shorter than a navigation route based on medium-bandwidth wireless network zones only or a navigation route based on mixed medium-bandwidth wireless network zones and high-bandwidth wireless network zones. It can be appreciated that navigation routes based on a medium QoS priority level may require more travel distance than navigation routes based on no QoS priority.

In another example, if a user does not intend on using high network intensive applications or medium network intensive applications during their route, the user may choose no QoS priority. In some embodiments, if a user chooses no QoS priority level for the navigation route, the mobile device 104 may not take into account any of the periodically received network accessibility information from the centralized database (FIG. 2) to provide the user with the navigation route. The user may be provided with a route that passes through dead-zones or wireless network zones with low bandwidth. In certain scenarios, the navigation route based on no QoS priority may be the shortest and/or fastest route from the starting point to the ending point. In some embodiments, the mobile device 104 may prompt to the user that the user may experience limited or no wireless network connectivity throughout the navigation route.

It can be appreciated that the provided navigation route may take into account a combination of the different wireless network accessibility information described in FIGS. 3-6. The different wireless network accessibility information includes, but is not limited to: wireless network number, wireless network type, wireless network name, wireless network location coordinates, wireless network average signal strength, wireless network congestion level, mobile device type, mobile device operating system, and wireless network handoff information.

Figure 7:
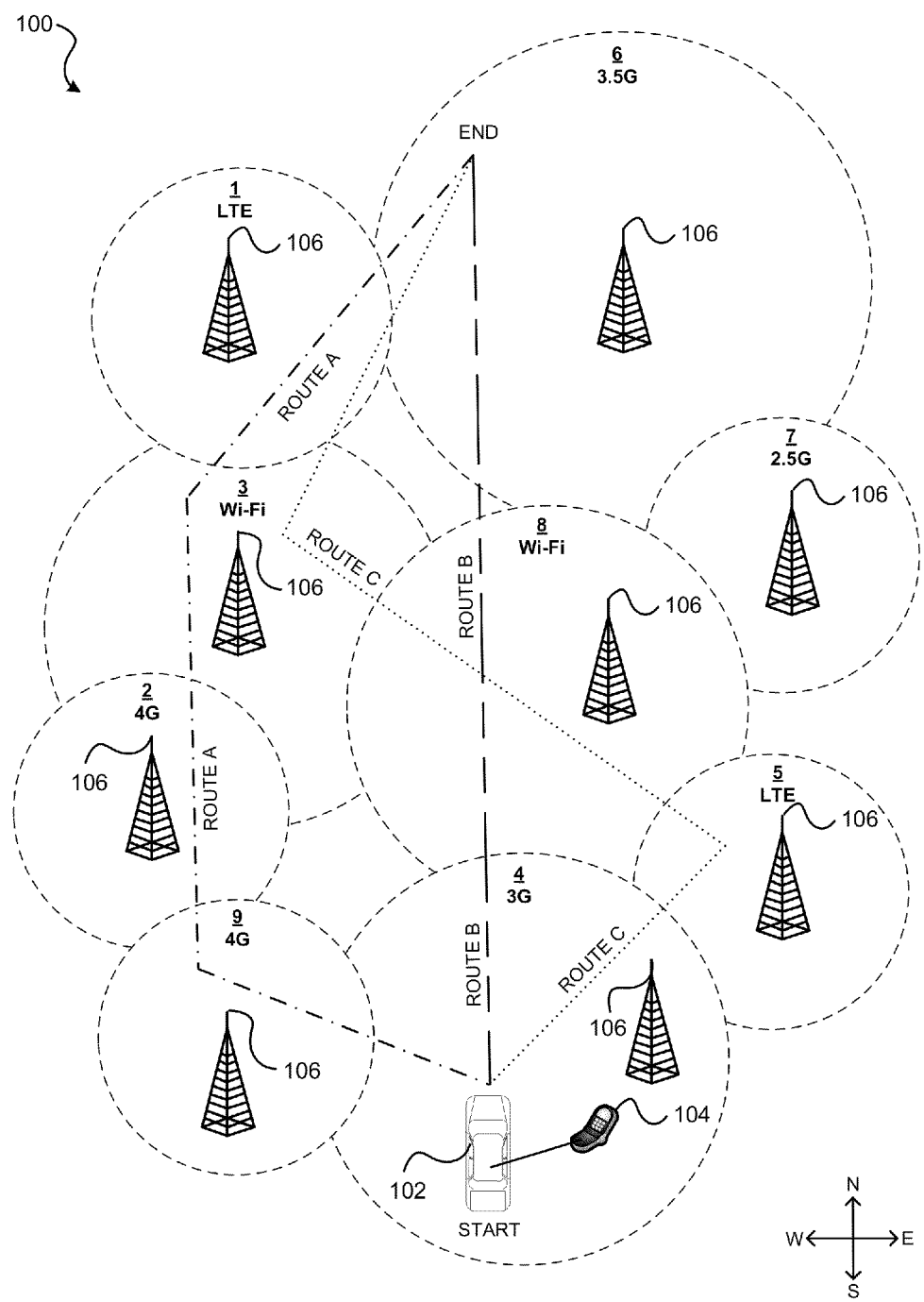
FIG. 7 illustrates a number of potential navigation routes through a geospace based on wireless network accessibility according to some embodiments of the present invention.

FIG. 7 illustrates a number of potential navigation routes through a geospace 100 based on wireless network accessibility according to some embodiments of the present invention. Similar to FIG. 1, the geospace 100 includes a number of wireless networks 106 which may be capable of providing wireless network connectivity within a certain range or zone of the geospace 100. Further, the geospace 100 includes a mobile device 104 which may travel with a user through the geospace 100 in a vehicle 102. Given a starting point and an ending point, typically provided by the user, the mobile device 104 may provide a navigation route to the user that is determined based on a QoS priority level indicated by the user. In this particular example, there are three possible navigation routes (ROUTE A, ROUTE B, and ROUTE C), with each route being based on a user's selected QoS priority level, as described above.

In this particular example, ROUTE A exemplifies a navigation route based on a medium QoS priority level, ROUTE B exemplifies a navigation route based on no QoS priority level, and ROUTE C exemplifies a navigation route based on a high QoS priority level. For example, in response to a user request for a navigation route from mobile device 104, the mobile device 104 may prompt the user to select a QoS priority level, as described in FIG. 6. If a user selects a medium QoS priority level, the mobile device 104 may provide the user, after taking into account the available network accessibility information from the centralized database 208 (FIG. 2), with ROUTE A as the suggested navigation route through the geospace 100. ROUTE A is a navigation route that travels through both high-bandwidth and medium-bandwidth network zones (in this case 4G, Wi-Fi, and LTE zones) within the geospace 100. However, by virtue of the user selecting a medium QoS priority level, ROUTE A will attempt to avoid low-bandwidth network zones and dead zones when possible. By attempting to travel through only medium-bandwidth and high-bandwidth network zones, the user may experience optimal performance from medium network intensive applications on the mobile device 104 while travelling through the geospace 100, as described above. It can be appreciated that ROUTE A may not be the shortest navigation route, in terms of distance from the starting point to the ending point, of the potential navigation routes. In this particular example, even though the user has indicated a medium QoS priority level, ROUTE A still begins in a 3G network zone and ends in a 3.5G network zone (both considered low-bandwidth network zones) by virtue of the vehicle 102 (or user) starting point and ending point.

Similarly, ROUTE C exemplifies a navigation route based on a high QoS priority level. For example, in response to a user request for a navigation route from mobile device 104, the mobile device 104 may prompt the user to select a QoS priority level, as described in FIG. 6. If a user selects a high QoS priority level, the mobile device 104 may provide the user, after taking into account the available network accessibility information from the centralized database 208 (FIG. 2), with ROUTE A as the navigation route through the geospace 100. ROUTE C is a navigation route that travels through high-bandwidth network zones (in this case Wi-Fi, and LTE zones) within the geospace 100. However, by virtue of the user selecting a high QoS priority level, ROUTE C will attempt to avoid medium-bandwidth network zones, low-bandwidth network zones, and dead zones when possible. By attempting to travel only through only high-bandwidth network zones, the user may experience optimal performance from high network intensive applications on the mobile device 104 while travelling through the geospace 100, as described above. It can be appreciated that ROUTE C may not be the shortest navigation route, in terms of distance from the starting point to the ending point, of the potential navigation routes. In this particular example, even though the user has indicated a high QoS priority level, ROUTE C still begins in a 3G network zone and ends in a 3.5G network zone (both considered low-bandwidth network zones) by virtue of the vehicle 102 (or user) starting point and ending point.

Similarly, ROUTE B exemplifies a navigation route based on no QoS priority level. For example, in response to a user request for a navigation route from mobile device 104, the mobile device 104 may prompt the user to select a QoS priority level, as described in FIG. 6. If a user selects no QoS priority level, the mobile device 104 may provide the user, with the shortest or fastest route without taking into account the available network accessibility information from the centralized database 208 (FIG. 2). In this example, ROUTE B is the shortest route from the starting point to the ending point. ROUTE C is a navigation route that travels through low-bandwidth network zones, medium-bandwidth network zones, high-bandwidth network zones, and even dead zones within the geospace 100. By travelling through any type of network zone within the geospace 100, the user may not experience optimal performance from medium and/or high network intensive applications on the mobile device 104 while travelling. However, the mobile device 104 may use the network accessibility information to pre-fetch data for a mobile device 104 application prior to the mobile device 104 entering a low-bandwidth network zone or dead zone (see below).

Data Prefetching

As mentioned above, the mobile device 104 may use the network accessibility information to pre-fetch data for a mobile device 104 application prior to the mobile device 104 entering a low-bandwidth network zone or dead zone. In some embodiments, the pre-fetching of data may occur while the mobile device 104 is travelling through a high-bandwidth network zone or a medium-bandwidth network zone and prior to being handed off to a low-bandwidth network zone or a dead zone. Some examples of mobile device 104 applications where pre-fetching data may be advantageous are: YouTube, Pandora, or any other non-real-time data application.

For example, in FIG. 7, if vehicle 102 travels ROUTE B from the starting point to the ending point, the mobile device 104 will encounter, in order, a 3G network zone (zone 4), Wi-Fi network zone (zone 8), and 3.5G network zone (zone 6). A user may decide to use an application on the mobile device 104, e.g. Pandora, along the route. While starting the route in a 3G network zone (zone 4), the mobile device 104 may use the 3G network connection to obtain data for use by the application as no other network type for pre-fetching is available at the starting point. Once the mobile device 104 enters the Wi-Fi network zone (zone 8), the mobile device 104 may continue to obtain data for use by the application. Further, the mobile device 104 may obtain a larger amount of data for pre-fetching prior to entering the 3.5G network zone (zone 6). Since the 3.5G network zones offers lower bandwidth than the Wi-Fi network zone, the mobile device may pre-fetch data for the application while within the Wi-Fi network zone (zone 8) and prior to the mobile device 104 entering the 3.5G network zone (zone 6). The mobile device 104 may obtain information about the network zone handoffs from the network accessibility information found within the centralized database 208 (FIG. 2). By pre-fetching application data prior to entering a low-bandwidth network zone, the mobile device 104 may provide the user with uninterrupted or seldom interrupted use of the application.

It can be appreciated that in providing the navigation route to the user, the navigation route may consider only the crowd-sourced data in the centralized database 208 (FIG. 2) that has been collected by other mobile devices of the same manufacturer type and/or mobile operating system. By accounting for the device specific information, the navigate route may provide a route, for example, where mobile devices of a certain manufacturer type/mobile operating system experience better network quality of service than other mobile devices of a different manufacturer type/mobile operating system.

Mobile Device Power Management

Figure 8A:
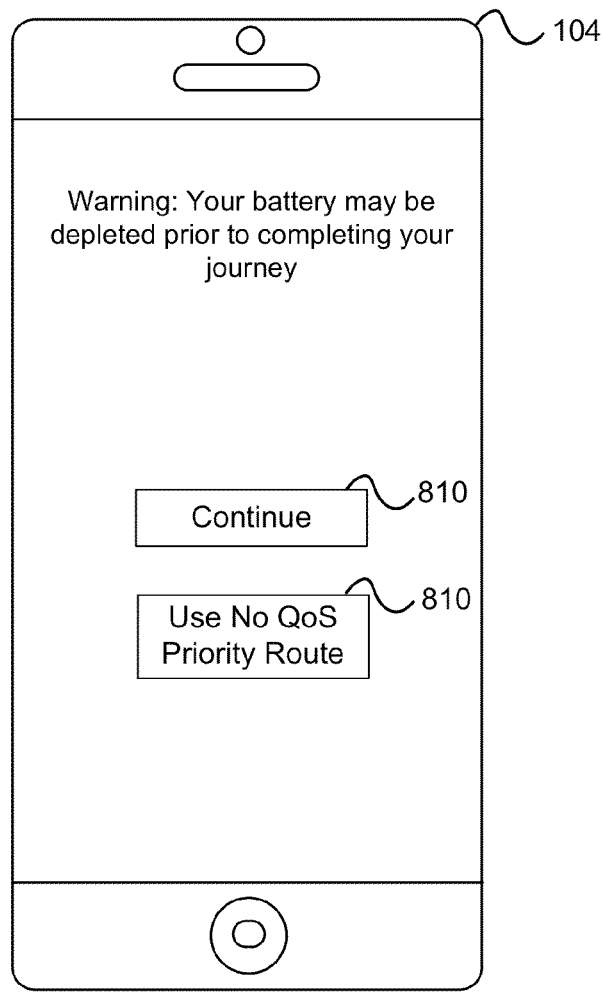
FIG. 8A illustrates a prompt presented for a battery consumption warning during a navigation route according to some embodiments of the present invention.

FIG. 8A illustrates a prompt 810 presented for a battery consumption warning during a navigation route according to some embodiments of the present invention. As described above, mobile device 104 may receive network availability information from a centralized database 208 (FIG. 2). In some embodiments, the network availability information from the centralized database 208 (FIG. 2) may be used to calculate an estimated battery consumption of the mobile device 104 while travelling through the geospace 100 (FIG. 1). Typically, the mobile device's radio/antenna is a large source of battery consumption on the mobile device 104. Radio/antenna communication within different network types may impact battery consumption in a different way. For example, the mobile device 104 may experience higher battery consumption within high-bandwidth network zones, e.g. LTE, as compared to medium-bandwidth or low-bandwidth network zones, e.g. 3G and 2G. Moreover, network coverage may also have an impact on the mobile device's 104 battery life. For example, network zones having better network coverage (stronger connectivity between the mobile device 104 and the network) may have less drain on the mobile device's 104 battery. Network zones having poorer network coverage may have a greater drain on the mobile device's 104 battery due to the mobile device 104 having to perform more frequent scans for a network connection.

In some embodiments, the mobile device 104 may take into account the network accessibility information stored within the centralized database 208 (FIG. 2) along with device specific information known about specific applications installed on the mobile device 104 to calculate an estimated battery consumption of the mobile device 104 while travelling through the geospace 100 (FIG. 1). For example, if a user indicates their intent to run a specific music streaming application (e.g. Pandora) on their mobile device 104 while also requesting a navigation route, the mobile device 104 may provide a warning to the user if the mobile device's 104 battery level may not be sufficient to run the application and also provide navigation through the geospace 100 (FIG. 1). The user may be provided with prompts 810 requesting whether the user wishes to disregard the warning and continue anyway, or continue navigation using no QoS priority along the route. If the user indicates they wish to continue navigation using no QoS priority along the route, a route will be provided without accounting for network accessibility information, as described above.

In some embodiments, the mobile device 104 may also proactively take measures to preserve battery life while travelling through the geospace 100. For example, using the network accessibility information in the centralized database 208 (FIG. 2), the mobile device 104 may switch off its network radio/antenna prior to an upcoming network handoff to a "dead zone." By doing so, the mobile device 104 may preserve battery life as the radio/antenna will be turned off and not frequently scanning for a network connection. Other non-network based functionality of the mobile device 104 may still be used. A popular term for this mode is "airplane mode."

Figure 8B:
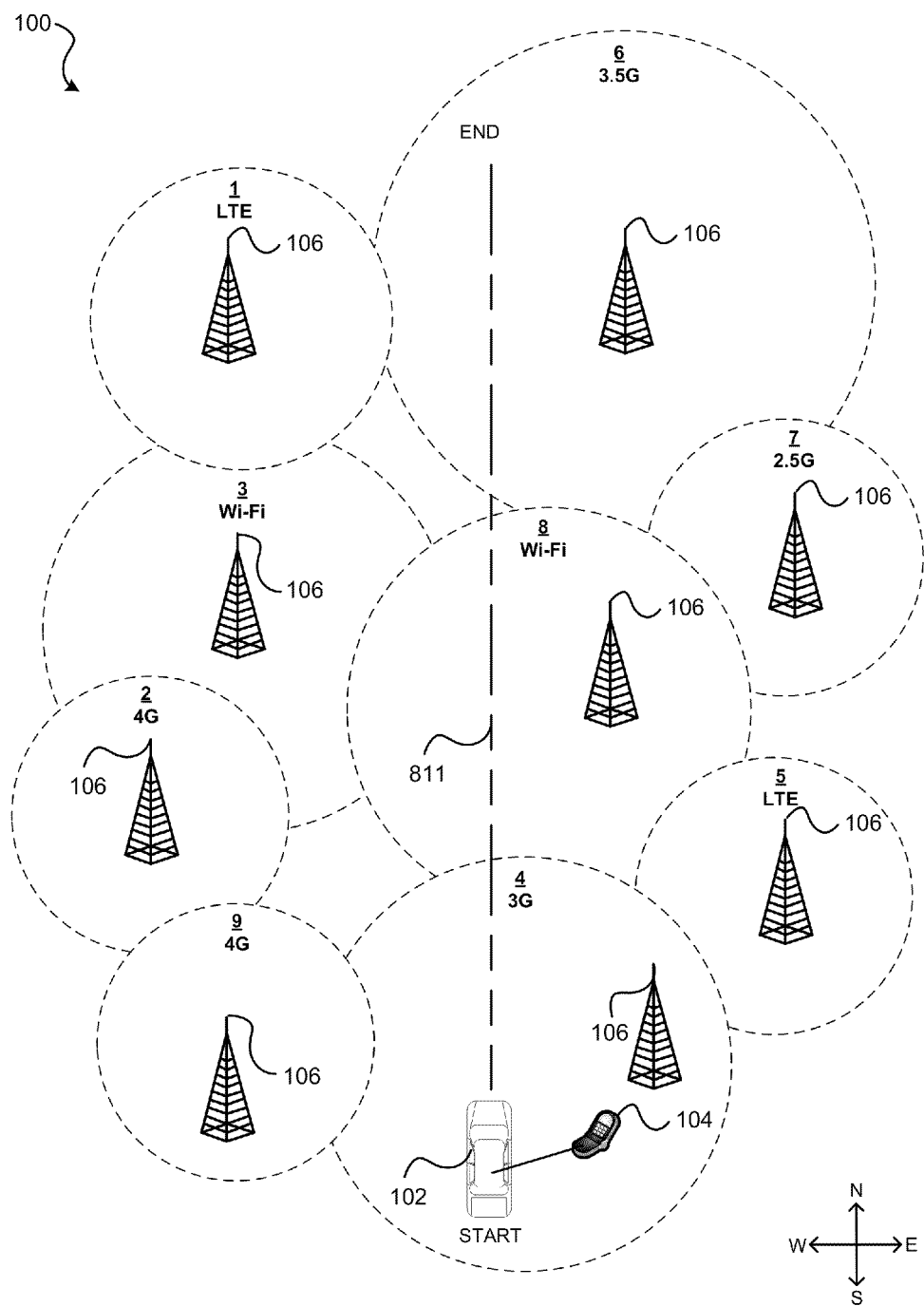
FIG. 8B illustrates of potential navigation route through a geospace based on mobile device battery consumption according to some embodiments of the present invention.

FIG. 8B illustrates a potential navigation route 811 through a geospace 100 based on mobile device 104 battery consumption according to some embodiments of the present invention. The device specific information in FIG. 4 may be combined with the network accessibility information in FIGS. 3 and 5 to determine a route based on estimated battery consumption of the mobile device 104 within the various networks. As described earlier, a user may elect to request a navigation route that results in the lowest power consumption of the mobile device 104. The cellular radio within the mobile device 104 may use an average amount of the mobile device's 104 battery (as described in FIG. 4). Additionally, the cellular radio consumes higher amounts of the battery when searching for networks, trying to connect to a low quality network, etc.

The navigation route 811 shown provides a user with the shortest route that travels through the network zones having a high signal strength and a high average speed. In this particular example, the navigation route 811 travels through the starting 3G network (zone 4), a Wi-Fi network (zone 8), and the ending 3.5G network (zone 6). By providing a route through the networks having a high signal strength and high average speed, the cellular radio may not have to search for networks and/or periodically lose connection the network requiring reconnection. As such, the battery of the mobile device 104 may be preserved for a longer amount of time. It can be appreciated that the mobile device 104 may also turn off the cellular radio in certain zones to preserve the battery life.

Sharing Network Accessibility Information with a Personal Navigation Device

Figure 9:
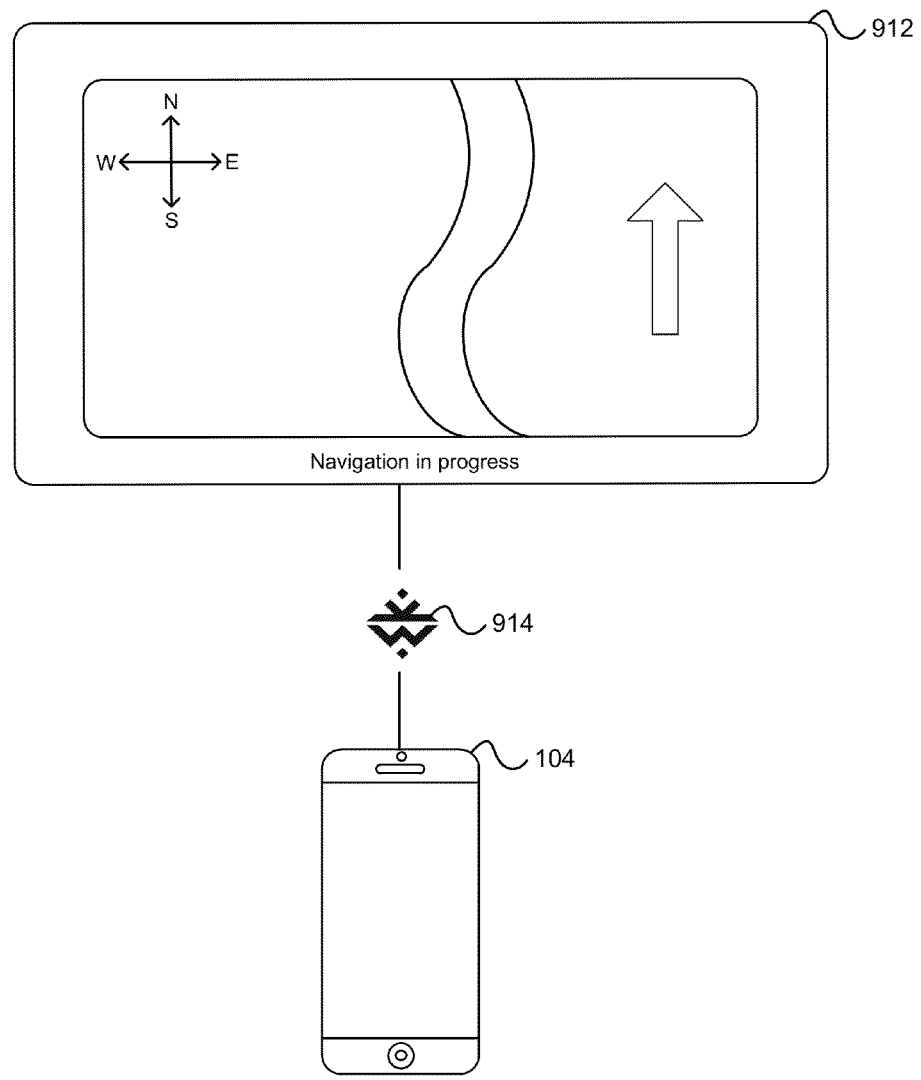
FIG. 9 illustrates a mobile device forwarding wireless network accessibility information to a personal navigation device via a wireless communication protocol according to embodiments of the present invention.

FIG. 9 illustrates mobile device 104 forwarding wireless network accessibility information to a personal navigation device 912 via a wireless communication protocol 914 according to embodiments of the present invention. Personal navigation devices 912 have become popular for consumer use in the past decade. In some embodiments, the mobile device 104 may share the network accessibility information within the centralized database 208 (FIG. 2) with the personal navigation device 912. This sharing may be accomplished using an ad-hoc wireless communication protocol 914, e.g. Bluetooth or Wi-Fi. For example, if a user's mobile device 104 does not have a navigation application for purposes of providing a navigation route within the geospace 100, the mobile device 104 may still be capable of receiving the network accessibility information from the centralized database 208 (FIG. 2). The mobile device 104 may share the network accessibility information to the personal navigation device 912. As such, the personal navigation device 912 may take into account the network accessibility information when providing a navigation route to the user through the geospace 100 (FIG. 1), similar to the various embodiments described above. The user may then still select from various QoS priority levels and be provided with a navigation route, from the personal navigation device 912, that accounts for QoS of the application the user intends to use on the mobile device 104.

Figure 10A:
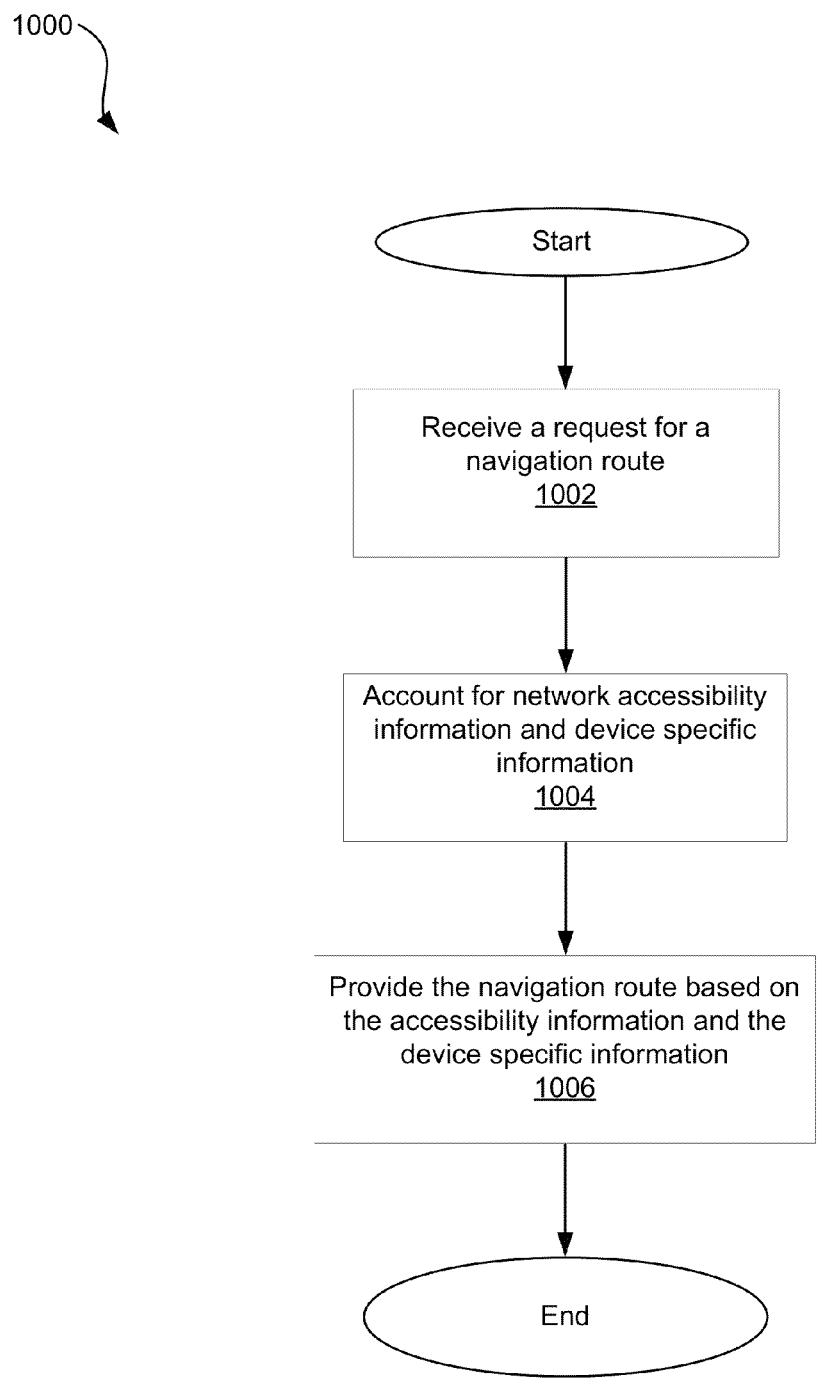
FIG. 10A is a flow diagram illustrating a method for providing a navigation route based on wireless network accessibility information and device specific information according to embodiments of the present invention.

FIG. 10A is a flow diagram 1000 illustrating a method for providing a navigation route based on wireless network accessibility information and device specific information according to embodiments of the present invention. The method of FIG. 10A may be executed by a computer system, for example the computer system of FIG. 11. In block 1002, a request for a navigation route is received. The request may be received by a user of a mobile device. The user may provide a start location and destination location. Alternatively, the mobile device may determine the start location based on its present location.

In block 1004, network accessibility information and device specific information is accounted for. The network accessibility information and device specific information may be stored within a centralized database that is accessible by the mobile device. The network accessibility information includes, but is not limited to, signal strength information of the wireless network, network congestion information of the wireless network, communication standard information of the wireless network, and geographic location information of the wireless network. The device specific information may include manufacturer information of the mobile device, operating system information of the mobile device, and mobile subscriber plan information of the mobile device. For example, the centralized database in FIG. 3 illustrates the network accessibility information and the device specific information. In some embodiments, data stored within the centralized database may be crowd-sourced by different mobile devices, as described above.

In block 1006, the navigation route is provided based on the accessibility information and the device specific information. In some embodiments, the mobile device may present options for a Quality of Service priority level. FIG. 6 exemplifies such a prompt. A user may request a navigation route, from a start point to an end point, from the mobile device. It can be appreciated that the provided navigation route may take into account a combination of the different wireless network accessibility information and device specific information described in FIGS. 3-6. The different wireless network accessibility information and device specific information includes, but is not limited to: wireless network number, wireless network type, wireless network name, wireless network location coordinates, wireless network average signal strength, wireless network congestion level, mobile device type, mobile device operating system, and wireless network handoff information. The provided navigation route may also take into account the user's selected QoS priority level.

Figure 10B:
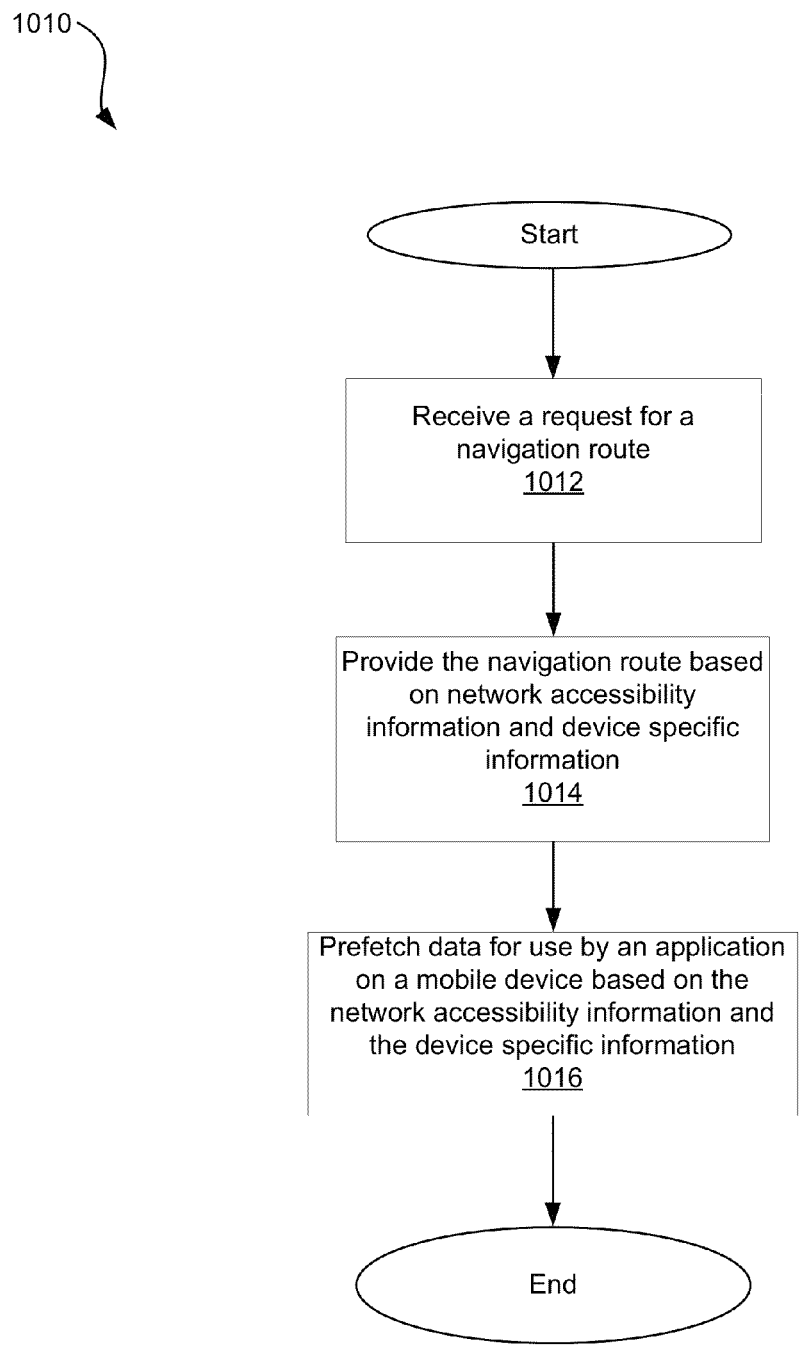
FIG. 10B is a flow diagram illustrating a method for prefetching data for use by an application on a mobile device based on wireless network accessibility information and device specific information.

FIG. 10B is a flow diagram 1010 illustrating a method for prefetching data for use by an application on a mobile device based on wireless network accessibility information and device specific information. The method of FIG. 10B may be executed by a computer system, for example the computer system of FIG. 11. In block 1012, a request for a navigation route is received. The request may be received by a user of a mobile device. The user may provide a start location and destination location. Alternatively, the mobile device may determine the start location based on its present location.

In block 1014, the navigation route is provided based on the accessibility information and the device specific information. The navigation route may be provided in a manner similar to that of block 1006 of FIG. 10A.

In block 1016, data is prefetched for use by an application on a mobile device based on the network accessibility information and the device specific information. As mentioned above, the mobile device may use the network accessibility information to pre-fetch data for a mobile device application prior to the mobile device entering a low-bandwidth network zone or dead zone. In some embodiments, the pre-fetching of data may occur while the mobile device is travelling through a high-bandwidth network zone or a medium-bandwidth network zone and prior to being handed off to a low-bandwidth network zone or a dead zone.

Figure 10C:
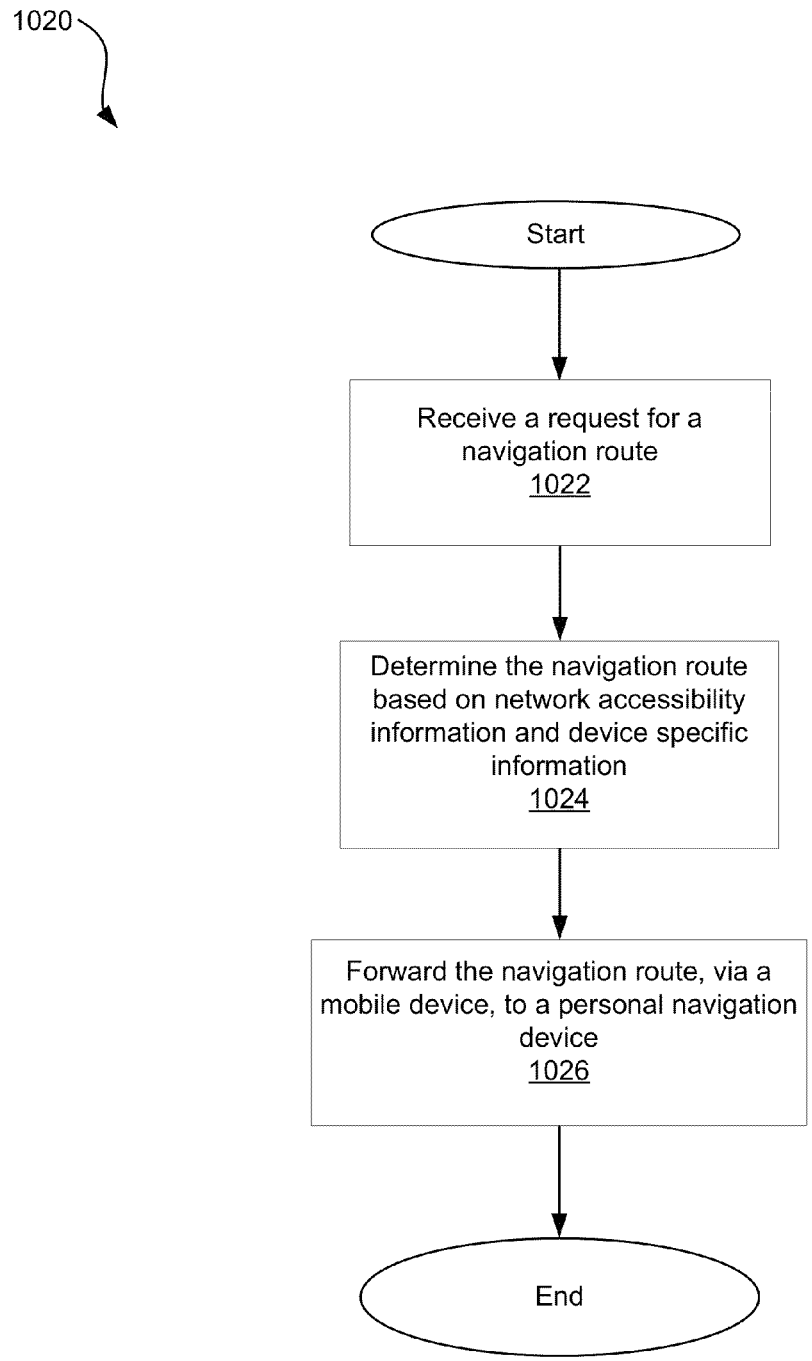
FIG. 10C is a flow diagram illustrating a method for forwarding a navigation route from a mobile device to a personal navigation device.

FIG. 10C is a flow diagram 1020 illustrating a method for forwarding a navigation route from a mobile device to a personal navigation device. The method of FIG. 10C may be executed by a computer system, for example the computer system of FIG. 11. In block 1022, a request for a navigation route is received. The request may be received by a user of a mobile device. The user may provide a start location and destination location. Alternatively, the mobile device may determine the start location based on its present location.

In block 1024, the navigation route is determined based on network accessibility information and device specific information. The navigation route may be determined in a manner similar to the navigation route being provided in block 1006 on FIG. 10A.

In block 1026, the navigation route is forwarded, via the mobile device, to a personal navigation device. This sharing may be accomplished using an ad-hoc wireless communication protocol, e.g. Bluetooth or Wi-Fi. In some embodiments, the navigation route is forwarded to the personal navigation device upon the mobile device determining the navigation route based on the network accessibility information and the device specific information.

In some embodiments, the mobile device may share the network accessibility information and device specific information within the centralized database with the personal navigation device. As such, the personal navigation device may take into account the network accessibility information when providing a navigation route to the user through the geospace 100 (FIG. 1), similar to the various embodiments described above.

Figure 10D:
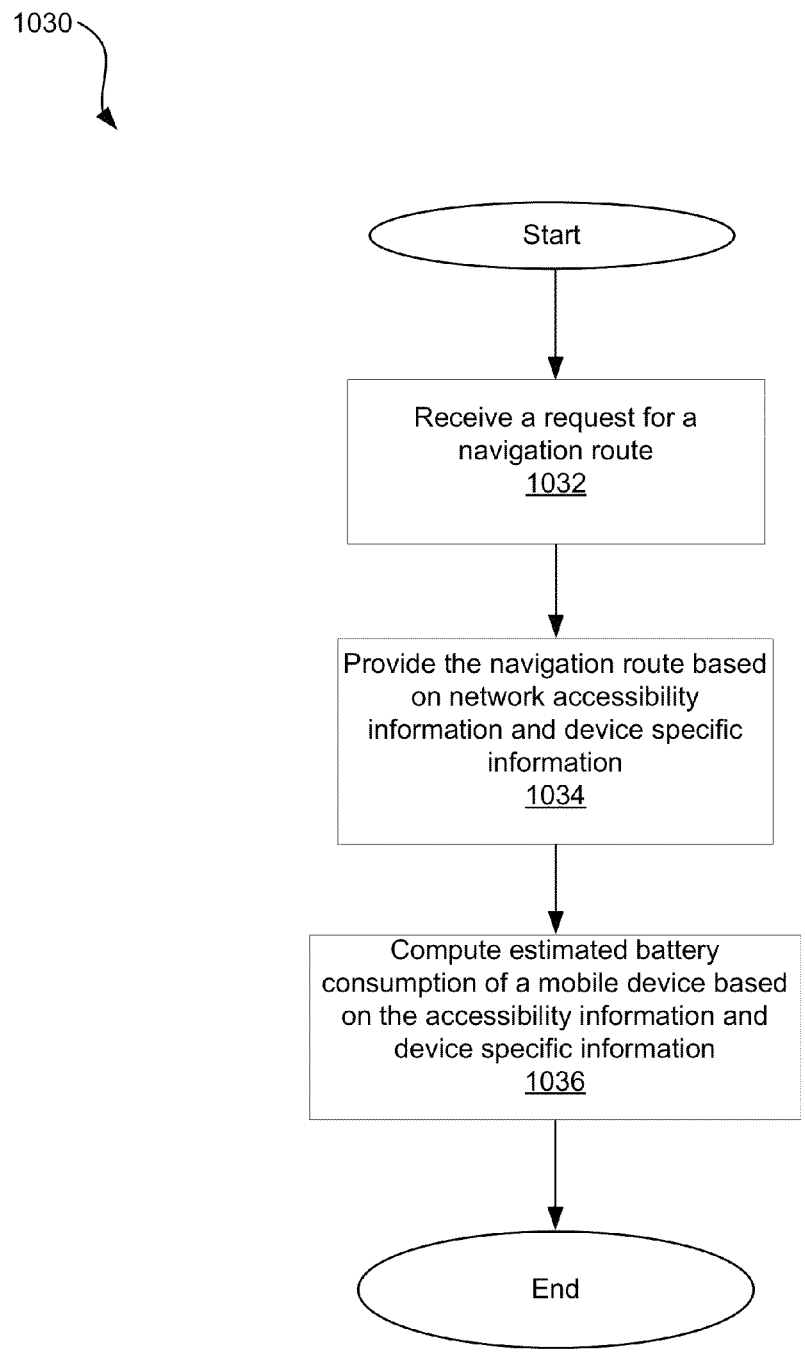
FIG. 10D is a flow diagram illustrating a method for computing estimated battery consumption of a mobile device based on wireless network accessibility information and device specific information.

FIG. 10D is a flow diagram 1030 illustrating a method for computing estimated battery consumption of a mobile device based on wireless network accessibility information and device specific information. The method of FIG. 10D may be executed by a computer system, for example the computer system of FIG. 11. In block 1032, a request for a navigation route is received. The request may be received by a user of a mobile device. The user may provide a start location and destination location. Alternatively, the mobile device may determine the start location based on its present location.

In block 1034, the navigation route is provided based on the accessibility information and the device specific information. The navigation route may be provided in a manner similar to that of block 1006 of FIG. 10A.

In block 1036, an estimated battery consumption of the mobile device is computed based on the accessibility information and the device specific information. In some embodiments, the mobile device may take into account the network accessibility information stored within the centralized database, the mobile device specific information stored within the centralized database, along with information known about specification applications installed on the mobile device to calculate an estimated battery consumption of the mobile device while travelling through the geospace.

In some embodiments, the mobile device may also proactively take measures to preserve battery life while travelling through the geospace. For example, using the network accessibility information and the device specific information stored in the centralized database, the mobile device may switch off its network radio/antenna prior to an upcoming network handoff to a "dead zone." By doing so, the mobile device may preserve battery life as the radio/antenna will be turned off and not frequently scanning for a network connection. Other non-network based functionality of the mobile device may still be used.

All of the embodiments described above may be practiced in such systems such as a computer system.

Figure 11:
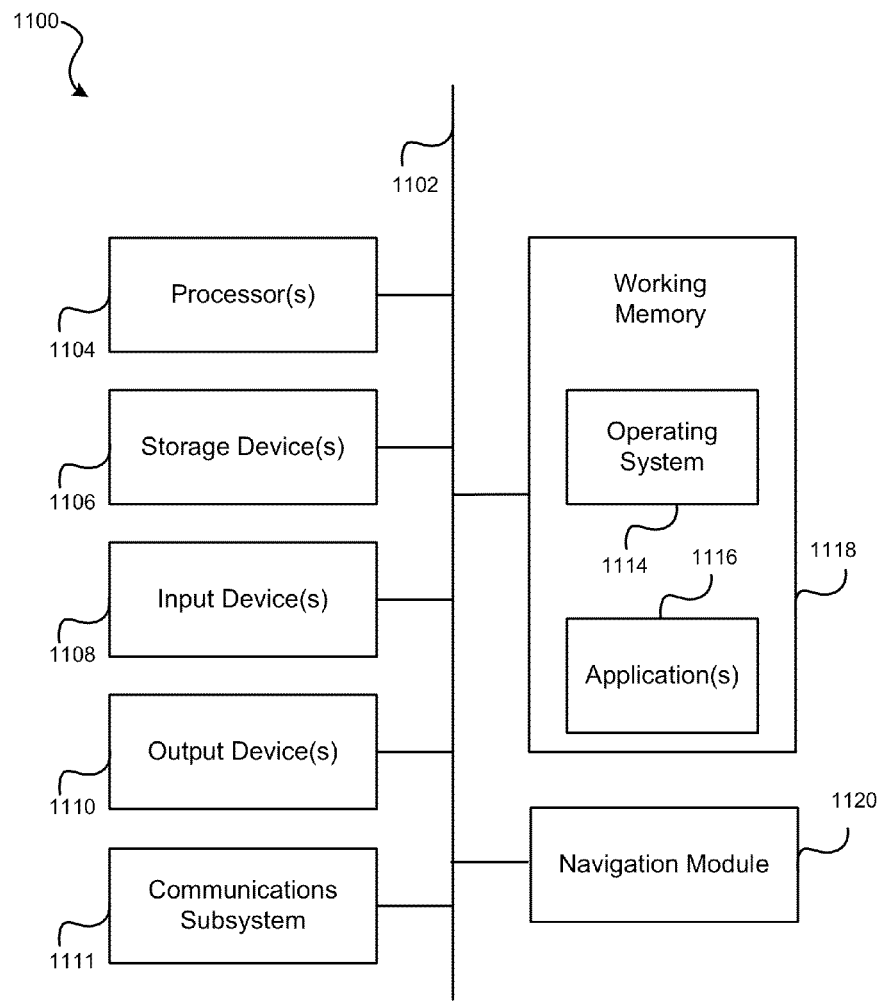
FIG. 11 illustrates an exemplary computer system incorporating parts of the device employed in practicing embodiments of the invention.

FIG. 11 illustrates an exemplary computer system incorporating parts of the device employed in practicing embodiments of the invention according to embodiments of the present invention. A computer system as illustrated in FIG. 11 may be incorporated as part of the above described computerized device. For example, computer system 1100 can represent some of the components of a television, a mobile device, a server, a desktop, a workstation, a control or interaction system in an automobile, a tablet, a netbook or any other suitable computing system. A mobile device may be any computing device with an image capture device or input sensory unit and a user output device. An image capture device or input sensory unit may be a camera device. A user output device may be a display unit. Examples of a mobile device include but are not limited to video game consoles, tablets, smart phones and any other hand-held devices. FIG. 11 provides a schematic illustration of one embodiment of a computer system 1100 that can perform the methods provided by various other embodiments, as described herein, and/or can function as the host computer system, a remote kiosk/terminal, a point-of-sale device, a telephonic or navigation or multimedia interface in an automobile, a mobile device, a set-top box, a table computer and/or a computer system. FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1102 (or may otherwise be in communication, as appropriate). The hardware elements may include one or more processors 1104, including without limitation one or more general-purpose processors and/or one or more special-purpose processors (such as digital signal processing chips, graphics acceleration processors, and/or the like); one or more input devices 1108, which can include without limitation one or more cameras, sensors, a mouse, a keyboard, a microphone configured to detect ultrasound or other sounds, and/or the like; and one or more output devices 1110, which can include without limitation a display unit such as the device used in embodiments of the invention, a printer and/or the like. In some implementations, input devices 1108 may include one or more sensors such as infrared and ultrasound sensors.

In some implementations of embodiments of the invention, the computer 1100 may further comprise a navigation module 1120 for purposes of determining location information of the computer system 1100. The navigation module 1120 may communicate with a global navigation satellite system (GNSS).

In some implementations of the embodiments of the invention, various input devices 1108 and output devices 1110 may be embedded into interfaces such as display devices, tables, floors, walls, and window screens. Furthermore, input devices 1108 and output devices 1110 coupled to the processors may form multi-dimensional tracking systems.

The computer system 1100 may further include (and/or be in communication with) one or more non-transitory storage devices 1106, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1100 might also include a communications subsystem 1112, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1112 may permit data to be exchanged with a network, other computer systems, and/or any other devices described herein. In many embodiments, the computer system 1100 will further comprise a non-transitory working memory 1118, which can include a RAM or ROM device, as described above.

The computer system 1100 also can comprise software elements, shown as being currently located within the working memory 1118, including an operating system 1114, device drivers, executable libraries, and/or other code, such as one or more application programs 1116, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1106 described above. In some cases, the storage medium might be incorporated within a computer system, such as computer system 1100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 1100 may be omitted or may be implemented separate from the illustrated system. For example, the processor 1104 and/or other elements may be implemented separate from the input device 1108. In one embodiment, the processor is configured to receive images from one or more cameras that are separately implemented. In some embodiments, elements in addition to those illustrated in FIG. 11 may be included in the computer system 1100.

Some embodiments may employ a computer system (such as the computer system 1100) to perform methods in accordance with the disclosure. For example, some or all of the procedures of the described methods may be performed by the computer system 1100 in response to processor 1104 executing one or more sequences of one or more instructions (which might be incorporated into the operating system 1114 and/or other code, such as an application program 1116) contained in the working memory 1118. Such instructions may be read into the working memory 1118 from another computer-readable medium, such as one or more of the storage device(s) 1106. Merely by way of example, execution of the sequences of instructions contained in the working memory 1118 might cause the processor(s) 1104 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 1100, various computer-readable media might be involved in providing instructions/code to processor(s) 1104 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1106. Volatile media include, without limitation, dynamic memory, such as the working memory 1118. Transmission media include, without limitation, coaxial cables, copper wire and fiber optics, including the wires that comprise the bus 1102, as well as the various components of the communications subsystem 1112 (and/or the media by which the communications subsystem 1112 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1104 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100. These signals, which might be in the form of electromagnetic signals, acoustic signals, optical signals and/or the like, are all examples of carrier waves on which instructions can be encoded, in accordance with various embodiments of the invention.

The communications subsystem 1112 (and/or components thereof) generally will receive the signals, and the bus 1102 then might carry the signals (and/or the data, instructions, etc. carried by the signals) to the working memory 1118, from which the processor(s) 1104 retrieves and executes the instructions. The instructions received by the working memory 1118 may optionally be stored on a non-transitory storage device 1106 either before or after execution by the processor(s) 1104.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Thus, in the description above, functions or methods that are described as being performed by the computer system may be performed by a processor—for example, the processor 1104—configured to perform the functions or methods. Further, such functions or methods may be performed by a processor executing instructions stored on one or more computer readable media.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method for providing a navigation route, comprising:
    receiving, at a mobile device, a request for a navigation route;
    querying a centralized database to obtain accessibility information relating to accessibility of at least one wireless network at different geographic locations along the navigation route and device specific information relating to technical attributes of the mobile device, wherein the accessibility information and the device specific information are crowd-sourced by a plurality of other mobile devices at different geographic locations;
    determining, via the mobile device, the navigation route based at least in part on the obtained accessibility information and the obtained device specific information; and
    providing, via the mobile device, the navigation route.

2. The method of claim 1 wherein the navigation route takes into account a quality of service (QoS) priority level.

3. The method of claim 1 wherein the accessibility information comprises:
    signal strength information of the wireless network;
    network congestion information of the wireless network;
    communication standard information of the wireless network; and
    geographic location information of the wireless network.

4. The method of claim 3 wherein the network congestion information comprises network congestion information in relation to time.

5. The method of claim 1 wherein the device specific information comprises:
    manufacturer information of the mobile device;
    operating system information of the mobile device; and
    mobile subscriber plan information of the mobile device.

6. The method of claim 1 wherein the accessibility information and the device specific information reside within a centralized database accessible by the mobile device.

7. The method of claim 1 further comprising prefetching data for use by an application residing on the mobile device based on the accessibility information, wherein the accessibility information comprises wireless network handover information.

8. The method of claim 1 wherein the accessibility information is periodically received by the mobile devices.

9. The method of claim 1 wherein the accessibility information is forwarded, via the mobile device, to a personal navigation device for providing the navigation route.

10. The method of claim 1 wherein the other mobile devices are on the same wireless network.

11. The method of claim 1 further comprising computing estimated battery consumption for the mobile device based on the accessibility information.

12. The method of claim 1 further comprising disabling a radio of the mobile device based on the accessibility information.

13. An apparatus for providing a navigation route, comprising:
    a navigation module configured to provide a navigation route;
    a processor coupled to the navigation module;
    wherein the processor is configured to receive a request for the navigation route;
    wherein the processor is configured to query a centralized database to obtain accessibility information relating to accessibility of at least one wireless network at different geographic locations along the navigation route and device specific information relating to technical attributes of a mobile device, wherein the accessibility information and the device specific information are crowd-sourced by a plurality of other mobile devices at different geographic locations;
    wherein the processor is configured to determine the navigation route based at least in part on the obtained accessibility information and the obtained device specific information; and
    wherein the processor is configured to provide the navigation route.

14. The apparatus of claim 13 wherein the navigation route takes into account a quality of service (QoS) priority level.

15. The apparatus of claim 13 wherein the accessibility information comprises:
  signal strength information of the wireless network;
  network congestion information of the wireless network;
  communication standard information of the wireless network; and
  geographic location information of the wireless network.

16. The apparatus of claim 15 wherein the network congestion information comprises network congestion information in relation to time.

17. The apparatus of claim 13 wherein the device specific information comprises:
  manufacturer information of the mobile device;
  operating system information of the mobile device; and
  mobile subscriber plan information of the mobile device.

18. The apparatus of claim 13 wherein the accessibility information and the device specific information reside within a centralized database accessible by the mobile device.

19. The apparatus of claim 13 wherein the processor is further configured to prefetch data for use by an application residing on the mobile device based on the accessibility information, wherein the accessibility information comprises wireless network handover information.

20. The apparatus of claim 13 wherein the accessibility information is periodically received by the mobile devices.

21. The apparatus of claim 13 wherein the accessibility information is forwarded, via the mobile device, to a personal navigation device for providing the navigation route.

22. The apparatus of claim 13 wherein the other mobile devices are on the same wireless network.

23. The apparatus of claim 13 wherein the processor is further configured to compute estimated battery consumption for the mobile device based on the accessibility information.

24. The apparatus of claim 13 wherein the processor is further configured to disable a radio of the mobile device based on the accessibility information.

25. A non-transitory computer program product residing on a processor-readable medium and comprising processor-readable instructions configured to cause a processor to:
  receive, via a mobile device, a request for a navigation route;
  query a centralized database to obtain accessibility information relating to accessibility of at least one wireless network at different geographic locations along the navigation route and device specific information relating to technical attributes of the mobile device, wherein the accessibility information and the device specific information are crowd-sourced by a plurality of other mobile devices at different geographic locations;
  determine the navigation route, based at least in part on the obtained accessibility information and the obtained device specific information; and
  provide, via the device, the navigation route.

26. The non-transitory computer program product of claim 25 wherein the accessibility information comprises:
  signal strength information of the wireless network;
  network congestion information of the wireless network;
  communication standard information of the wireless network; and
  geographic location information of the wireless network.

27. The non-transitory computer program product of claim 25 wherein the device specific information comprises:
  manufacturer information of the mobile device;
  operating system information of the mobile device; and
  mobile subscriber plan information of the mobile device.

28. The non-transitory computer program product of claim 25 wherein the instructions are further configured to cause the processor to prefetch data for use by an application residing on the mobile device based on the accessibility information, wherein the accessibility information comprises wireless network handover information.

29. The non-transitory computer program product of claim 25 wherein the instructions are further configured to cause the processor to compute estimated battery consumption for the mobile device based on the accessibility information.

* * * * *